(12) United States Patent
Schult et al.

(10) Patent No.: US 9,557,122 B2
(45) Date of Patent: Jan. 31, 2017

(54) HEAT EXCHANGER, HEATER AND GALLEY

(71) Applicant: Airbus Operations GmbH, Hamburg (DE)

(72) Inventors: Jens Schult, Hamburg (DE); Thorsten Truemper, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 697 days.

(21) Appl. No.: 13/749,857

(22) Filed: Jan. 25, 2013

(65) Prior Publication Data

US 2014/0027088 A1 Jan. 30, 2014

Related U.S. Application Data

(60) Provisional application No. 61/591,287, filed on Jan. 27, 2012.

(30) Foreign Application Priority Data

Jan. 27, 2012 (DE) .................. 10 2012 201 223

(51) Int. Cl.
*H05B 11/00* (2006.01)
*F28F 27/00* (2006.01)
(Continued)

(52) U.S. Cl.
CPC ............... *F28F 27/00* (2013.01); *B64D 11/04* (2013.01); *F25D 21/08* (2013.01); *F25B 2700/15* (2013.01); *Y02T 50/46* (2013.01)

(58) Field of Classification Search
CPC ......... F28F 27/00; F25D 21/08; F25D 21/008; F25D 21/04; F25D 21/00; F25D 21/116; F25D 21/06; F25D 17/06; F25B 2700/15; F25B 2700/2103; F25B 2700/2117; F25B 2700/21171;F25B 2700/21172; F25B 2700/21173; F25B 2700/21174; F25B 2700/21175; F25B 2700/21176; F25B 2700/21161; F25B 2700/21162; F25B 2700/21163; F25B 29/003; F25B 2400/22; F25B 2600/23; F25B 49/02; Y02T 50/46; B64F 1/364; F24F 1/025; B60H 1/3226
See application file for complete search history.

(56) References Cited

U.S. PATENT DOCUMENTS 3,483,919 A 12/1969 Wakai et al.
3,965,692 A * 6/1976 Ansted .................... F25B 49/02
62/193

(Continued)

FOREIGN PATENT DOCUMENTS

DE 218163 1/1985
GB 790111 * 2/1958
KR 900003025 5/1990

OTHER PUBLICATIONS

European Search Report, Sep. 17, 2014.

*Primary Examiner* — Shawntina Fuqua
(74) *Attorney, Agent, or Firm* — Greer, Burns & Crain Ltd.

(57) ABSTRACT

A heat exchanger for cooling air, with a coolant onward-flow connection for feeding liquid coolant for cooling air and a coolant return-flow connection for discharging liquid coolant. For removing ice by melting accumulated ice in the heat exchanger, a heater is provided that is associated with an electrical heating element. An operational safety device prevents overheating of the heater. The operational safety device comprises a fault-current detection device. Such a heater, with a heating element for heating air for subjecting accumulated ice to heated air, and with such an operational safety device is provided. Also, a galley for a commercial aircraft is provided with a receiving space for trolleys, and (Continued)

a cooling device for cooling the receiving space. The cooling device comprises such a heat exchanger for cooling air.

11 Claims, 3 Drawing Sheets

(51) Int. Cl.
*B64D 11/04* (2006.01)
*F25D 21/08* (2006.01)

(56) References Cited

U.S. PATENT DOCUMENTS

| | | |
|---|---|---|
| 4,432,211 A | 2/1984 | Oishi et al. |
| 6,845,627 B1 | 1/2005 | Buck |
| 2010/0031676 A1* | 2/2010 | Urbain .................. B64F 1/364 62/89 |

* cited by examiner

HEAT EXCHANGER, HEATER AND GALLEY

RELATED APPLICATIONS

This application claims benefit of U.S. provisional application No. 61/591,287, filed Jan. 27, 2012 and German patent application No. 10 2012 201 223.0, filed Jan. 27, 2012, the entire disclosures of which are herein incorporated by reference.

BACKGROUND OF THE INVENTION

The invention relates to a heat exchanger for cooling air, with a coolant onward-flow connection for supplying liquid coolant for cooling air, a coolant return-flow connection for discharging liquid coolant, a heater for removing ice by melting accumulated ice in the heat exchanger, wherein an electrical heating element for melting accumulated ice is also associated with the heater, and with an operational safety device for preventing overheating of the heater. Furthermore, the invention relates to a heater with a heating element for melting accumulated ice and with an operational safety device for preventing overheating of the heater, as well as a galley for a commercial aircraft, with a receiving space for trolleys and a cooling device for cooling the receiving space, wherein the cooling device comprises such a heat exchanger.

Commercial aircraft comprise galleys in which food and beverages can be prepared, for example heated up, for passengers. In order to also keep perishable food and beverages fresh and palatable for an extended period of time, such galleys comprise one or several coolable receiving spaces in which the food and beverages can be stored, or temporarily stored, in serving trolleys, hereinafter referred to as trolleys.

For cooling, a water-glycol mixture cooled to −9° C. is pumped through a heat exchanger within an air chilling unit (ACU). The above-mentioned value of −9° C. refers to a freely selectable setpoint temperature, set system-internally, relating to the liquid coolant. Other setpoint temperatures are also possible as long as the legally required value of 4° C. for storing food and beverages is maintained. A fan conveys air through the heat exchanger, which cools this air, so that by subjecting the food and beverages in the trolleys to cooled air, said food and beverages are cooled. Due to the low temperatures and the atmospheric humidity contained in the air, ice can form on the heat exchanger, which ice gradually blocks the air flow through the heat exchanger. In a defrosting cycle, such accumulated ice is regularly removed by a heater on the heat exchanger, by means of which heater the accumulated ice is melted. In the case of a malfunction this heater can generate inadmissibly high temperatures and therefore needs to be monitored.

This heater can be designed as a heating mat and can be bonded to a heat exchanger made of aluminium. At one point of the heating mat there is a temperature control fuse which is triggered if a limit value relating to the temperature of the heat exchanger is exceeded, and in this manner deactivates the heating mat. Such temperature monitoring is based on a functioning thermal path between the heating mat and the temperature control fuse. If the adhesive connection between the temperature control fuse and the heat exchanger fails, or if small bubbles form between the heat exchanger and the heating mat, this type of temperature control fuse no longer functions. A further type of malfunction relates to local failure of the heating mat, as a result of which arcing and thus the presence of very high local temperatures can occur. While the heat exchanger comprises a metallic housing, this can, however, not prevent excessive temperatures, in particular if the heating mat becomes detached or if arcing occurs.

SUMMARY OF THE INVENTION

It is thus the object of the invention to improve operational safety of such a heat exchanger, of a heater for such a heat exchanger, and of a galley with such a heat exchanger.

The heat exchanger for cooling air comprises a coolant onward-flow connection for feeding liquid coolant for cooling air and a coolant return-flow connection for discharging liquid coolant so that food and beverages can be subjected to cooled air in order to cool the aforesaid. Furthermore, the heat exchanger comprises a heater for removing ice by melting accumulated ice in the heat exchanger, wherein an electrical heating element for melting accumulated ice is associated with the heater. An operational safety device ensures that no overheating occurs during operation of the heater, i.e. during the defrost cycle, which overheating could, for example, result in melting of the electrical insulation of the heating resistor of the electrical heating element.

According to the invention it is provided that the operational safety device comprises a fault-current detection device for the detection of electrical fault currents. The invention thus turns away from the teaching known from the state of the art, namely from registering the temperature of the heater with the use of measuring technology, and if a threshold value relating to the temperature is exceeded to deactivating the heater, in other words to no longer supplying electrical power to it; instead, sensing takes place as to whether electrical fault currents flow, for example as a result of already melted electrical insulation of the heating resistor of the heating element. Thus a thermally conductive connection between the heating element and a temperature control fuse is no longer a prerequisite for reliable functioning of the operational safety device. Operational safety is thus enhanced.

The electrical fault currents can be electrical currents that flow through damaged electrical insulation, and/or the electrical fault currents are inadmissibly high electrical currents that are caused by a short-circuit with subsequent arcing. The heating element can be in direct thermally-conducting contact with the heat exchanger. As an alternative, it is also possible to heat air with the heater, wherein the accumulated ice can be subjected to this air in order to melt said ice.

Preferably it is provided that the operational safety device comprises a heat conducting element or shielding element that is made from an electrically conductive material and that is connectable to a ground connection, and the heat conducting element is in thermally conducting connection with the heating element. For example, the heat conducting element can be made from aluminium, copper or an alloy comprising copper or aluminium. The term "electrically conductive material" refers to a material whose electrical conductivity is greater than 106 s/m. By means of the electrically conductive connection of the heat conducting element with a ground connection, for example the ground of a commercial aircraft, and the thermally conductive connection to the heating element it is ensured that any failure of the heating element as a result of melting of the electrical insulation is detected even if, for example, the adhesive connection between the heating element and the heat exchanger becomes detached or forms bubbles, because in this case an electrical fault current flows over the heat conducting element and the ground connection. Thus, operational safety of the operational safety device is further enhanced, because it reliably functions also in the case of detachment of the heating element from the heat exchanger. Since the electrical fault current flowing over the heat conducting element can be detected by means of the fault-current detection device, the operational safety device features a particularly simple design because by means of the fault-current sensing device it is possible to detect both electrical fault currents.

To this effect it is preferably provided that the fault-current detection device deactivates the heating element when it registers that a fault-current limit value relating to an electrical fault current has been exceeded, and/or the fault-current detection device deactivates the heating element when it registers that a heat-conducting element limit-value relating to an electrical fault current through the heat conducting element has been exceeded. By selecting the extent of the limit values it can be excluded that the operational safety device is deactivated during a defrost cycle although no overheating of the heater is to be feared. In this manner it is possible to exclude malfunctions of the operational safety device, and operational safety overall can be improved.

Furthermore, it is preferably provided that a fan for generating a flow of forced air through the heat exchanger is associated with the heat exchanger, wherein the fault-current detection device when it registers that a fault-current limit value relating to an electrical fault current has been exceeded and/or a heat-conducting element limit-value relating to an electrical fault current through the heat conducting element has been exceeded deactivates the fan only after a minimum period of time has elapsed. Thus, the fault-current detection device will supply the fan with electrical power for a minimum period of time after a limit value has been exceeded; in other words the fan is deactivated only after a minimum period of time has elapsed and until then generates an airflow. As a result of this continued running of the fan, heat build-up in the heat exchanger is prevented so that it is ensured that any overheating of the heater cannot result in damage, which again improves operational safety.

The fault-current detection device preferably comprises a circuit breaker for all-pole disconnection of the heating element. The all-pole circuit breaker ensures that after the circuit breaker has been triggered the heater or the heating element is free of any voltage and no longer poses a danger, because it is no longer possible for persons, for example engaged in troubleshooting, to be endangered by electrical shocks. This is necessary, in particular, with the use of DC voltage which occurs in a bipolar manner. For example, in the case of 115 volts alternating voltage in the vehicle's electrical system, the DC link voltage is normally 270 volts. However, this is +/−135 volts referenced to the aircraft ground.

Preferably it is provided that the heating element is a heating mat of a sheet-like design that forms a heating element surface. As a result of the heating element comprising a sheet-like design, an increased radiating surface is provided, which results in quick heating so that the time required for a defrost cycle is shortened. Furthermore, preferably it is provided that the heat conducting element comprises a sheet-like design that forms a heat-component element surface, and that the heating element surface and the heat-component element surface, are connected so as to contact each other. For example, the heating element surface and the heat-conducting element surface can be interconnected in an integral manner, for example by bonding. By connecting the two surfaces it is possible to provide optimal heat transfer from the heating element to the heat conducting element, and thus evening out of the temperature distribution in the case of unequal heating is achieved. In this way a situation is prevented in which during strong local heating, e.g. as a result of arcing, further damage arises; instead, as a result of the evening-out effect of the heat conducting element the temperature increase is moderated and the occurrence of further damage is delayed.

Furthermore, it is preferably provided that the heater comprises a three-phase connection. The heater can thus without any problems be connected to the on-board three-phase system of a commercial aircraft, which system, for example, provides electrical power at 115 volts and 230 volts. In this arrangement the on-board three-phase system is designed in such a manner that its star point is connected to an electrical ground connection of the commercial aircraft, i.e. the electrical ground of the commercial aircraft forms the neutral conductor of the on-board three-phase system. As an alternative, a connection for a single-phase alternating current or direct current can be provided. In the case of using direct current, fault-current determination can take place with the use of, for example, Hall sensors.

Furthermore, it is preferably provided that the heater comprises a rectifier that on the input side is connected in an electrically conductive manner to the three-phase connection, and that on the output side comprises an intermediate circuit capacitor. Thus the rectifier is designed for rectifying 3-phase rotary current. The intermediate circuit capacitor is galvanically inseparable from the rectifier and thus connected in an electrically conductive manner to the three-phase connection. In this context the term "galvanically inseparable" refers to an electrically conductive connection that cannot be disconnected by switches, for example the circuit breaker, but only by the undoing of clamp-type connections for producing the electrically conductive connection, or by destroying the electrical lines that interconnect the three-phase connection, the rectifier and/or the intermediate circuit capacitor.

The heat conducting element is preferably formed by an integral housing section of the heat exchanger. As an alternative, the heat conducting element is a component that has been manufactured separately of the heat exchanger housing, which component has, for example, been placed in the housing. Integrating the heat conducting element in the housing provides an advantage, when compared to separate manufacture, in particular in that the heat exchanger can be manufactured so as to be of a more lightweight nature.

Furthermore, the invention relates to a heater, in particular relating to a heat exchanger according to the invention, with a heating element for heating air for subjecting accumulated ice to heated air, and to an operational safety device for preventing overheating of the heater.

According to the invention it is provided that the operational safety device comprises a fault-current detection device for the detection of electrical fault currents.

Furthermore, the invention also relates to a galley for a commercial aircraft, with a receiving space for trolleys and a cooling device for cooling the receiving space, wherein the cooling device comprises a heat exchanger for cooling air, wherein the heat exchanger comprises a coolant onward-flow connection for the supply of liquid coolant for cooling air, and the heat exchanger comprises a coolant return-flow connection for discharging liquid coolant, wherein a heater for removing ice by melting accumulated ice in the heat exchanger is associated with the heat exchanger, wherein a heating element for heating air for subjecting accumulated ice to heated air is associated with the heater, and wherein an operational safety device to prevent overheating of the heater is associated with the heat exchanger.

According to the invention it is provided that the operational safety device comprises a fault-current detection device for the detection of electrical fault currents.

Further advantageous improvements of the invention are the subject of further subordinate claims.

BRIEF DESCRIPTION OF THE DRAWINGS

Below, preferred exemplary embodiments of the invention are explained in more detail with reference to greatly simplified diagrammatic illustrations. The following are shown.

DETAILED DESCRIPTION OF THE PREFERRED EMBODIMENTS

Figure 1:
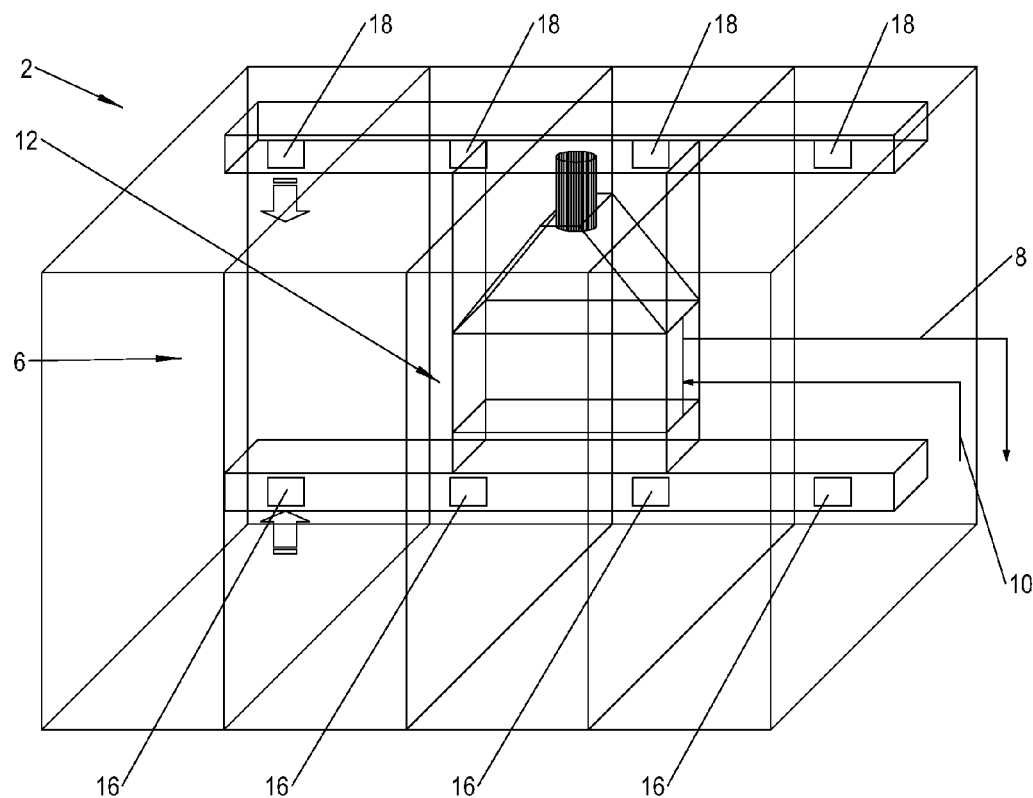
FIG. 1 a perspective view of a section of an exemplary embodiment of a galley according to the invention.

In the figures identical constructive elements have identical reference characters. However, for reasons associated with clarity, in the case of several identical elements in the figures only some elements appear with a reference character.

Figure 2:
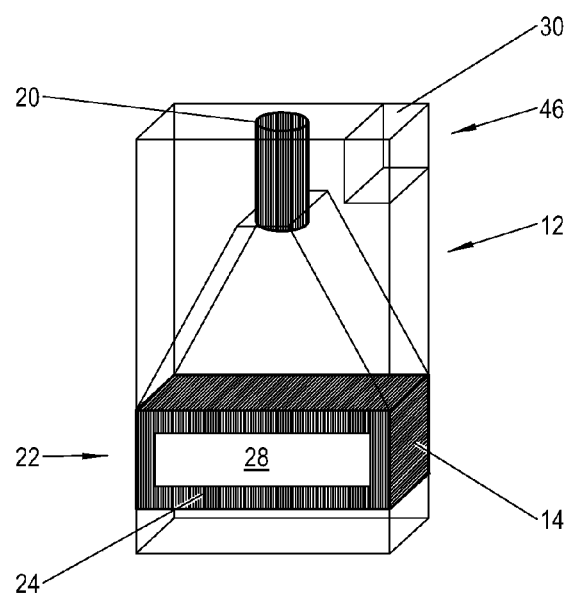
FIG. 2 a perspective view of an air chilling unit for the galley of FIG. 1.

First, reference is made to FIGS. 1 and 2.

FIG. 1 shows a section of a galley 2 as can be installed in commercial aircraft.

In the present exemplary embodiment the galley 2 comprises four receiving spaces 4 for trolleys (not shown) in which food and beverages (not shown) can temporarily be stored until they are prepared.

In order to prevent spoiling of the food and beverages temporarily stored in the trolleys, the receiving spaces 4 can be cooled. For this purpose a cooling device 6 for cooling the receiving spaces 4 is provided. The cooling device 6 comprises a coolant onward-flow connection 8 and a coolant return-flow connection 10 by means of which an air chilling unit 12 (ACU) liquid coolant, in the present exemplary embodiment a water/glycol mixture comprising a temperature of, for example, −9° C., can be fed to or discharged from an air chilling unit.

The air chilling unit 12 comprises a heat exchanger 14 (see FIG. 2), which in the present exemplary embodiment is made from aluminium. The heat exchanger 14 is in communication with an air inlet 16 and an air outlet 18 of the galley 2 so that air from the receiving spaces 4 can be drawn in through the air inlet 16 and can be supplied to the heat exchanger 14 of the air chilling unit 12, and after the aforesaid has been cooled in the heat exchanger 14 said air can be returned through the air outlet 18 to the receiving spaces 4. For the purpose of generating the air flow between the air inlet 16 and the air outlet 18 the air chilling unit 12 comprises a fan 20 (see FIG. 2), which in the present exemplary embodiment comprises an electric motor (not shown) as a drive.

During operation the liquid coolant is fed through the heat exchanger 14 so that air is cooled that is drawn in through the air inlet 16 of the galley 2 and is returned to the galley 2 by way of an air outlet 18 in order to subject the food and beverages in the trolleys in the receiving spaces 4 to cooled air, thus extending their period of freshness. However, during operation of the cooling device 6, accumulated ice can form in the heat exchanger 14 from condensed atmospheric humidity, which accumulated ice can partly or completely block the airflow from the air inlet 16 to the air outlet 18. In order to remove this accumulated ice heater 22 for removing ice by melting accumulated ice in the heat exchanger 14 is associated with said heat exchanger 14. The heater 22 comprises an electrical heating element 24 for melting accumulated ice, which heating element 24 in the present exemplary embodiment is designed as a heating mat 28 with an electrical heating resistor (not shown) and in the present exemplary embodiment is in direct thermally conducting contact with the heat exchanger 14.

In this arrangement the removal of accumulated ice takes place at predetermined intervals or as required by operating the heater 22 or the heating mat 28. To control the heater 22 at predetermined intervals or as required, a control system 30 is provided. In order to ensure that no undesired overheating of the heater 22 occurs in this process, an operational safety device 46 is provided.

Below, the design and function of the operational safety device 46 are explained with additional reference to FIG. 3.

Figure 3:
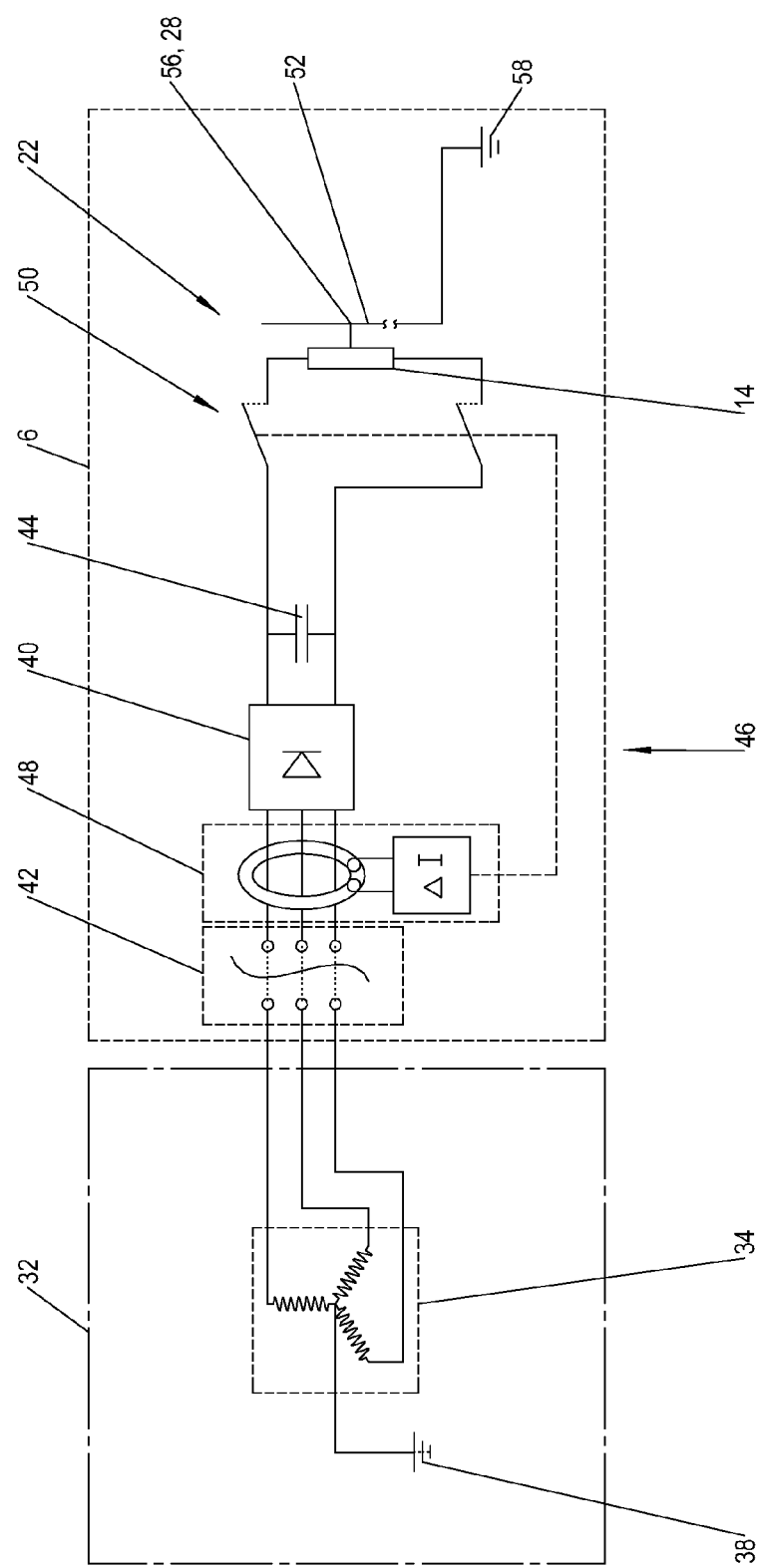
FIG. 3 an equivalent electric circuit diagram according to a first exemplary embodiment.

According to FIG. 3 the cooling device 6 is electrically connected to a vehicle's electrical system 32 of a commercial aircraft in order to supply the air chilling unit 12 with electrical energy for its operation.

The vehicle's electrical system 32 comprises a generator 34, which in the present exemplary embodiment is designed as a three-phase generator, and with the star point 36 of said generator 34 being electrically connected to a ground connection 38 of the commercial aircraft. The three-phase generator in the present exemplary embodiment for example generates electrical power with an electrical alternating voltage of 115 volts to ground and an outer conductor voltage of 230 volts. However, the three-phase generator can also generate electrical power with an electrical alternating voltage of 230 volts to ground and an outer conductor voltage of 400 volts.

The cooling device 6 itself comprises a rectifier 40 for converting the electrical three-phase current supplied by the generator 34 to electrical direct current which by way of a three-phase connection 42 is connected to the vehicle's electrical system 32. For smoothing the electrical direct current an intermediate circuit capacitor 44 is arranged downstream of the rectifier 40. During the defrost phase the heating mat 28 is supplied with the smoothed direct current. The direct current at the same time also supplies an inverter for operating the drive for the fan 20, which drive is designed as a three-phase motor.

Below, the design of an operational safety device 46 is explained. Firstly, the operational safety device 46 in the present exemplary embodiment comprises a fault-current detection device 48 for the detection of electrical fault currents. On the input side the fault-current detection device 48 is arranged upstream of the rectifier 40; in other words the fault-current detection device 48 monitors whether the sum of the electrical currents of the individual phases of the three-phase current, which currents flow into the rectifier 40 and from the rectifier 40, are zero or exceed a predetermined fault-current limit value. In the present exemplary embodiment the fault-current detection device 48 is designed to determine an electrical fault current by means of the induction method. In other words an electrical fault current generates a magnetic field that triggers a switching operation. Alternative methods include, for example, Hall sensors or shunts with operational amplifiers and sum formation.

The fault-current detection device 48 is in effective connection with a circuit breaker 50 so that an electrical fault current that exceeds the fault-current limit value triggers a switching operation in the fault-current detection device 48, which operation causes the circuit breaker 50 to separate the heater 22 from the intermediate circuit capacitor 44 so that no further electrical power is fed to the heating mat 28, and the latter can cool down. In this arrangement, according to the present exemplary embodiment, it is provided that the circuit breaker 50 is designed for all-pole separation of the heater 22 or the heating mat 28 from its power supply. This ensures that following the triggering of the circuit breaker 50 the heater 22 has zero potential and no longer poses a danger.

Secondly, the operational safety device 46 in the present exemplary embodiment comprises a heat conducting element 52 or shielding element. The heat conducting element 52 is manufactured from an electrically conductive material such as, for example, aluminium, copper or an alloy comprising copper or aluminium, and is thus preferably metallic. Like the heating mat 28, the heat conducting element 52 is of a sheet-like design and is formed by an integral section of the heat exchanger housing. As an alternative, the heat conducting element is a component manufactured separately of the heat exchanger housing, which component has been inserted in the housing or has been applied on the outside onto the heating mat 28. In this arrangement the sheet-like design of the heat conducting element 52 forms a heat-conducting element surface 54, while the sheet-like design of the heating mat 28 forms a heating element surface 56. In order to achieve particularly good heat transfer between the heating mat 28 and the heat conducting element 52, in the present exemplary embodiment the heating element surface 56 and the heat-conducting element surface 54 are interconnected over the entire area, for example by means of an integral connection such as a bonded connection.

The heat conducting element 52 is electrically connected to a further ground connection 58 of the commercial aircraft. Thus if the melted electrical insulation of the electrical heating resistor of the heating mat 28 fails, an electrical current flows by way of the heat conducting element 52 to the second ground connection 58. In this arrangement the fault-current detection device 48 is designed in such a manner that when it registers that a fault-current limit value through the heat conducting element 52, which fault-current limiting value relates to an electrical fault current, has been exceeded, the heater 22 is separated from its power supply by activation of the circuit breaker 50.

Thus, during operation, concurrently with activating the heater 22 with the heating mat 28 for removing ice deposits on the heat exchanger 14 the fault-current detection device 48 is activated. Subsequently the fault-current detection device 48 monitors whether the fault-current limit value relating to an electrical fault current and/or the heat-conducting element limiting value relating to an electrical fault current is being exceeded by the heat conducting element 52. When it registers that the fault-current limit value and/or the heat-conducting element limit-value relating to an electrical fault current through the heat conducting element 52 has been exceeded, the heater 22 is separated by the circuit breaker 50 from its electrical power supply, in other words the heating element 24 is deactivated. However, after this the fault-current detection device 48 supplies electrical power to the fan 20 for generating a forced air flow through the heat exchanger 14 for a minimum period of time; in other words the fan 20 is deactivated only after a minimum period of time has elapsed. As a result of this continued running of the fan 20, heat build-up in the heat exchanger 14 is prevented so that it is ensured that any overheating of the heater 22 cannot result in damage.

Figure 4:
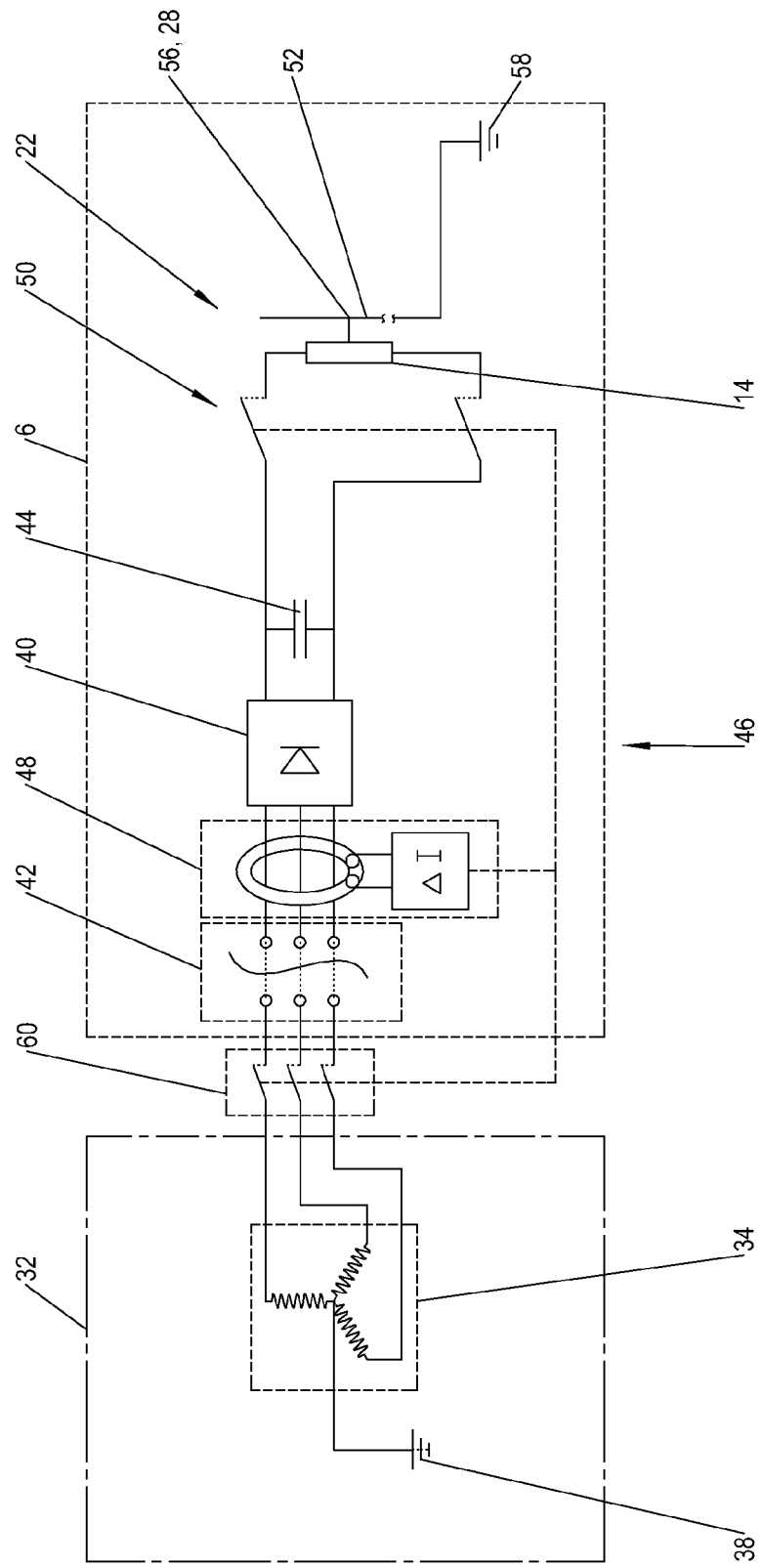
FIG. 4 an equivalent electric circuit diagram according to a second exemplary embodiment.

FIG. 4 shows a modification of the equivalent circuit diagram of FIG. 3, in which modification on the input side upstream of the three-phase connection 42 a remotely-controlled circuit breaker 60 (RCCB) is provided that is also in effective connection with the fault-current detection device 48 in such a manner that when the limit values are exceeded the remotely-controlled circuit breaker 60 causes separation from the vehicle's electrical system 32. In this arrangement the remotely-controlled circuit breaker 60 is designed for all-pole disconnection. In this manner it is possible to save weight and expenditure because this switch-off device is already present at the aircraft level.

The invention relates to a heat exchanger 14 for cooling air, with a coolant onward-flow connection 8 for feeding liquid coolant for cooling air, and a coolant return-flow connection 10 for discharging liquid coolant. For the removal of ice by melting accumulated ice in the heat exchanger 14 a heater 22 is provided which comprises an associated electrical heating element 24 for melting accumulated ice. An operational safety device 46 prevents overheating of the heater 22.

According to the invention it is provided that the operational safety device 46 comprises a fault-current detection device 48 for the detection of electrical fault currents.

Furthermore, the invention relates to a heater 22, with a heating element 24 for melting accumulated ice and with such an operational safety device 46, and to a galley 2 for a commercial aircraft, with a receiving space 4 for trolleys, and a cooling device 6 for cooling the receiving space 4, wherein the cooling device 6 comprises such a heat exchanger 14 for cooling air.

By means of the invention the operational safety of such a heat exchanger 14, of a heater 22 for such a heat exchanger 14, and of a galley 2 with such a heat exchanger 14 is improved.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS

2 Galley
4 Receiving space
6 Cooling device
8 Coolant onward-flow connection
10 Coolant return-flow connection
12 Air chilling unit (ACU)
14 Heat exchanger
16 Air inlet
18 Air outlet
20 Fan
22 Heater
24 Heating element
28 Heating mat
30 Control system
32 Vehicle's electrical system
34 Generator
36 Star point 40 Rectifier
42 Three-phase connection
44 Intermediate circuit capacitor
46 Operational safety device
48 Fault-current detection device
50 Circuit breaker
52 Heat conducting element
54 Heat-conducting element surface
56 Heating element surface
58 Ground connection
60 Remotely-controlled circuit breaker

The invention claimed is:

1. A heat exchanger for cooling air, comprising:
a coolant onward-flow connection for feeding liquid coolant for cooling air,
a coolant return-flow connection for discharging liquid coolant,
a heater for removing ice by melting accumulated ice in the heat exchanger,
an electrical heating element for melting accumulated ice being associated with the heater, and
an operational safety device for preventing overheating of the heater,
the operational safety device comprising a fault-current detection device for the detection of electrical fault currents.

2. The heat exchanger of claim 1, wherein the operational safety device comprises a heat conducting element made from an electrically conductive material and connectable to a ground connection, and the heat conducting element is in thermally conductive connection with the heating element.

3. The heat exchanger of claim 2, wherein the fault-current detection device is configured to deactivate the heating element when it registers that at least one of a fault-current limit value relating to an electrical fault current has been exceeded and a heat-conducting element limit-value relating to an electrical current through the heat conducting element has been exceeded.

4. The heat exchanger of claim 3, wherein a fan for generating a flow of forced air through the heat exchanger is associated with the heat exchanger, wherein the fault-current detection device is configured to deactivate the fan only after a minimum period of time has elapsed after the fault-current detection device registers that at least one of a fault-current limit value relating to an electrical fault current has been exceeded and a heat-conducting element limit-value relating to an electrical fault current through the heat conducting element has been exceeded.

5. The heat exchanger of claim 1, wherein the fault-current detection device comprises a circuit breaker for all-pole disconnection of the heating element.

6. The heat exchanger of claim 1, wherein the heating element is a heating mat of a sheet-like design that forms a heating element surface, the heat conducting element comprises a sheet-like design that forms a heat-conducting element surface, and the heating element surface and the heat-conducting element surface are connected so as to contact each other.

7. The heat exchanger of claim 1, wherein the heater comprises a three-phase connection.

8. The heat exchanger of claim 7, wherein the heater comprises a rectifier that on the input side is connected in an electrically conductive manner to the three-phase connection and that on the output side comprises an intermediate circuit capacitor.

9. The heat exchanger of any one of the preceding claims, wherein the heat conducting element is a housing section of the heat exchanger.

10. A heater, for a heat exchanger of claim 1, with a heating element for melting accumulated ice, and with an operational safety device for avoiding overheating of the heater, wherein the operational safety device comprises a fault-current detection device for the detection of electrical fault currents.

11. A galley for a commercial aircraft, comprising:
a receiving space for trolleys,
a cooling device for cooling the receiving space,
the cooling device comprising a heat exchanger for cooling air,
the heat exchanger comprising a coolant onward-flow connection for the supply of liquid coolant for cooling air,
the heat exchanger comprising a coolant return-flow connection for discharging liquid coolant,
the heat exchanger being associated with a heater for removing ice by melting accumulated ice in the heat exchanger,
a heating element for melting accumulated ice being associated with the heater, and
an operational safety device to prevent overheating of the heater being associated with the heat exchanger,
the operational safety device comprising a fault-current detection device for the detection of electrical fault currents.

* * * * *